(12) United States Patent
Johnson

(10) Patent No.: US 7,503,477 B2
(45) Date of Patent: Mar. 17, 2009

(54) METHOD FOR OFFERING LOCATION-BASED TARGETED DISCOUNTS WITHOUT REQUIREMENT FOR LOCATION SENSING

(75) Inventor: Michael Joseph Johnson, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 356 days.

(21) Appl. No.: 10/985,786

(22) Filed: Nov. 9, 2004

(65) Prior Publication Data

US 2006/0097043 A1    May 11, 2006

(51) Int. Cl.
G06F 17/00 (2006.01)
G06K 15/00 (2006.01)
G06K 5/00 (2006.01)
G06Q 20/00 (2006.01)

(52) U.S. Cl. .................. 235/375; 235/380; 235/378; 705/16; 705/20

(58) Field of Classification Search ............... 23/375, 23/378, 380; 705/16, 20, 21, 26, 64
See application file for complete search history.

(56) References Cited

U.S. PATENT DOCUMENTS

| | | | |
|---|---|---|---|
| 4,870,579 A * | 9/1989 | Hey | 705/27 |
| 4,996,642 A * | 2/1991 | Hey | 705/27 |
| 5,642,485 A * | 6/1997 | Deaton et al. | 705/14 |
| 5,649,114 A * | 7/1997 | Deaton et al. | 705/14 |
| 5,909,023 A * | 6/1999 | Ono et al. | 235/380 |
| 5,918,211 A * | 6/1999 | Sloane | 705/16 |
| 6,026,370 A * | 2/2000 | Jermyn | 705/14 |
| 6,123,259 A * | 9/2000 | Ogasawara | 235/380 |
| 6,377,935 B1 * | 4/2002 | Deaton et al. | 705/14 |
| 6,386,450 B1 * | 5/2002 | Ogasawara | 235/383 |
| 6,453,347 B1 * | 9/2002 | Revashetti et al. | 709/224 |
| 6,611,811 B1 * | 8/2003 | Deaton et al. | 705/14 |
| 6,622,125 B1 * | 9/2003 | Cragun et al. | 705/14 |
| 6,659,344 B2 | 12/2003 | Otto et al. | 235/381 |
| 7,155,405 B2 * | 12/2006 | Petrovich | 705/26 |
| 7,170,414 B2 * | 1/2007 | Clifford et al. | 340/572.3 |
| 2001/0014868 A1 * | 8/2001 | Herz et al. | 705/14 |
| 2002/0116218 A1 * | 8/2002 | Tanaka et al | 705/1 |
| 2002/0139846 A1 * | 10/2002 | Needham et al. | 235/383 |
| 2002/0143613 A1 | 10/2002 | Hong et al. | 705/14 |
| 2002/0156677 A1 | 10/2002 | Peters et al. | 705/14 |
| 2002/0170961 A1 * | 11/2002 | Dickson et al. | 235/383 |
| 2002/0186133 A1 * | 12/2002 | Loof | 340/572.1 |
| 2003/0009394 A1 * | 1/2003 | Malkin et al. | 705/27 |
| 2003/0083944 A1 * | 5/2003 | Duvall et al. | 705/21 |
| 2003/0132298 A1 * | 7/2003 | Swartz et al. | 235/472.02 |
| 2003/0149612 A1 | 8/2003 | Berghofer et al. | 705/10 |
| 2003/0195800 A1 * | 10/2003 | Peters | 705/14 |
| 2003/0220836 A1 | 11/2003 | Mortimer | 705/14 |
| 2004/0079804 A1 * | 4/2004 | Harding et al. | 235/472.02 |

(Continued)

*Primary Examiner*—Daniel Walsh
(74) *Attorney, Agent, or Firm*—Sawyer Law Group LLP

(57) ABSTRACT

In a method and system for providing location-based targeted information without requiring location sensing, items are scanned while the customer shops. The sequences in which items are scanned are collected and analyzed to determine the next probable item for a currently scanned item. The next probable item will generally be physically near the currently scanned item. Information for a next probable item correlating to a currently scanned item can then be displayed to the customer. In this manner, location-based targeted information can be provided without requiring location sensing. This significantly reduces the cost of the system.

20 Claims, 3 Drawing Sheets

U.S. PATENT DOCUMENTS

| | | | |
|---|---|---|---|
| 2004/0103003 A1* | 5/2004 | Reade et al. | 705/16 |
| 2004/0230482 A1* | 11/2004 | Hendrickson | 705/14 |
| 2004/0230499 A1* | 11/2004 | Stack | 705/26 |
| 2004/0238629 A1* | 12/2004 | Buchholz | 235/383 |
| 2005/0010472 A1* | 1/2005 | Quatse et al. | 705/14 |
| 2005/0049914 A1* | 3/2005 | Parish | 705/14 |
| 2005/0058483 A1* | 3/2005 | Chapman et al. | 400/76 |
| 2005/0187819 A1* | 8/2005 | Johnson | 705/14 |
| 2005/0198095 A1* | 9/2005 | Du et al. | 709/200 |
| 2005/0216347 A1* | 9/2005 | Williams et al | 705/14 |
| 2005/0259797 A1* | 11/2005 | Swartz et al. | 379/93.12 |
| 2006/0047577 A1* | 3/2006 | Dietz et al. | 705/26 |
| 2006/0074769 A1* | 4/2006 | Looney et al. | 705/26 |
| 2006/0097043 A1* | 5/2006 | Johnson | 235/383 |
| 2007/0061247 A1* | 3/2007 | Ramer et al. | 705/37 |

* cited by examiner

METHOD FOR OFFERING LOCATION-BASED TARGETED DISCOUNTS WITHOUT REQUIREMENT FOR LOCATION SENSING

FIELD OF THE INVENTION

The present invention relates to targeted displays of information, and more particularly to providing location-based targeted displays of information without requiring location sensing.

BACKGROUND OF THE INVENTION

Targeted offers and preferred discounts are well-known in the retailing business. The idea is to entice additional or preferential customer purchases by presenting offers a particular customer is more likely to appreciate. Currently, several methods are used to present these offers. For example, discounts or coupons are offered on future purchases of the same or competitive brands of a product the customer is now purchasing; coupons are offered via dispensers located near the associated products; or targeted discounts are offered based on a customer identifier and a recorded prior purchase history for that customer.

Where an electronic display is available for an individual customer, such as a device mounted to a shopping cart or a hand-held device, the offer is made based on the current location of the customer. For example, an electronic coupon for a particular brand of soft drink is offered when the customer is in the soft drink aisle. However, to implement this method, the current location of the customer must be known, requiring an expensive location detection system which involves numerous sensors throughout the store. The current store layout must be known as well and stored in a database. Since the store layout may change often, expensive and frequent maintenance of the location information in the database are required.

Accordingly, there exists a need for a method and system for providing location-based targeted information without requiring location sensing. The method and system should provide such information without requiring knowledge of the current location of the customer or knowledge of the store layout. The present invention addresses such a need.

SUMMARY OF THE INVENTION

In a method and system for providing location-based targeted information without requiring location sensing, items are scanned while the customer shops. The sequences in which items are scanned are collected and analyzed to determine the next probable item for a currently scanned item. The next probable item will generally be physically near the currently scanned item. Information for a next probable item correlating to a currently scanned item can then be displayed to the customer. In this manner, location-based targeted information can be provided without requiring location sensing. This significantly reduces the cost of the system.

DETAILED DESCRIPTION

The present invention provides a method for providing location-based targeted information without requiring location sensing. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below.

Figure 1:
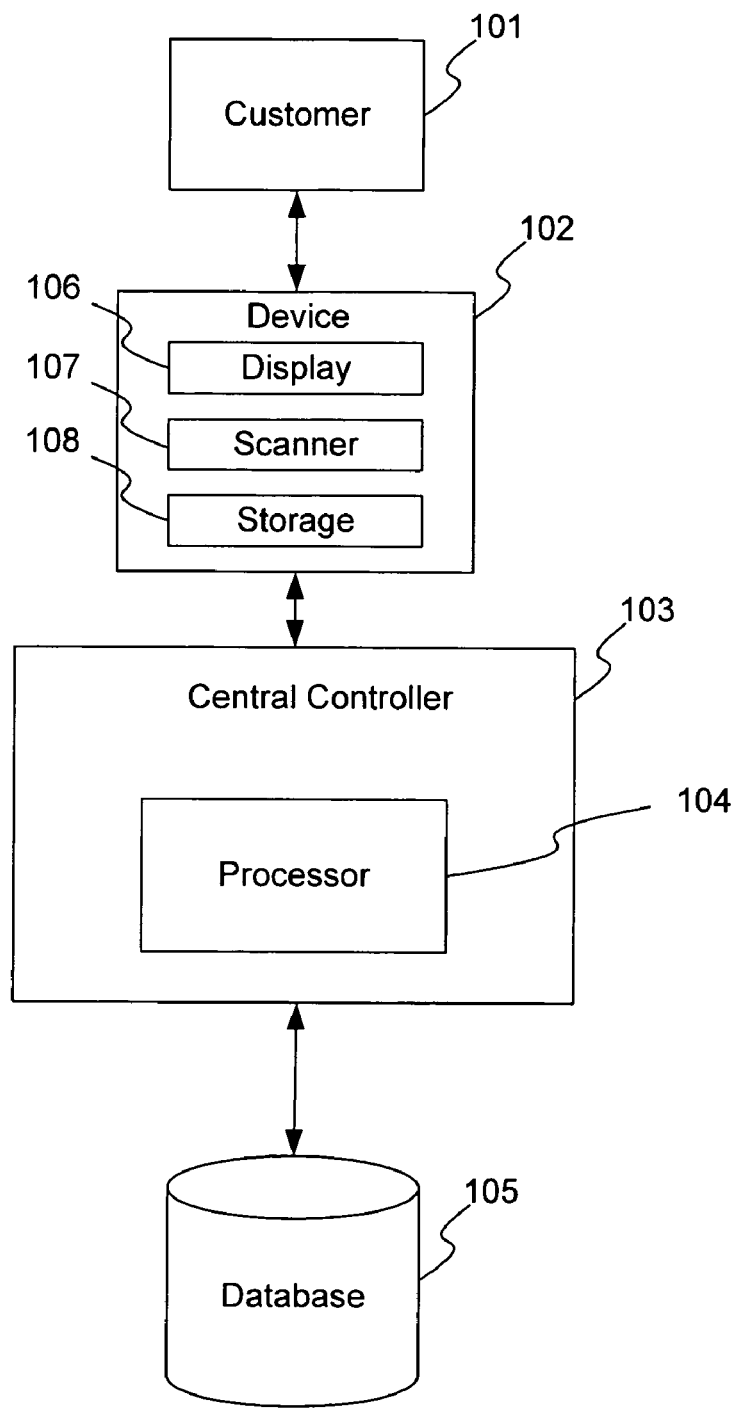
FIGS. 1 and 2 illustrate a preferred embodiment of a system and a method, respectively, for providing location-based targeted information in accordance with the present invention.
Figure 2:
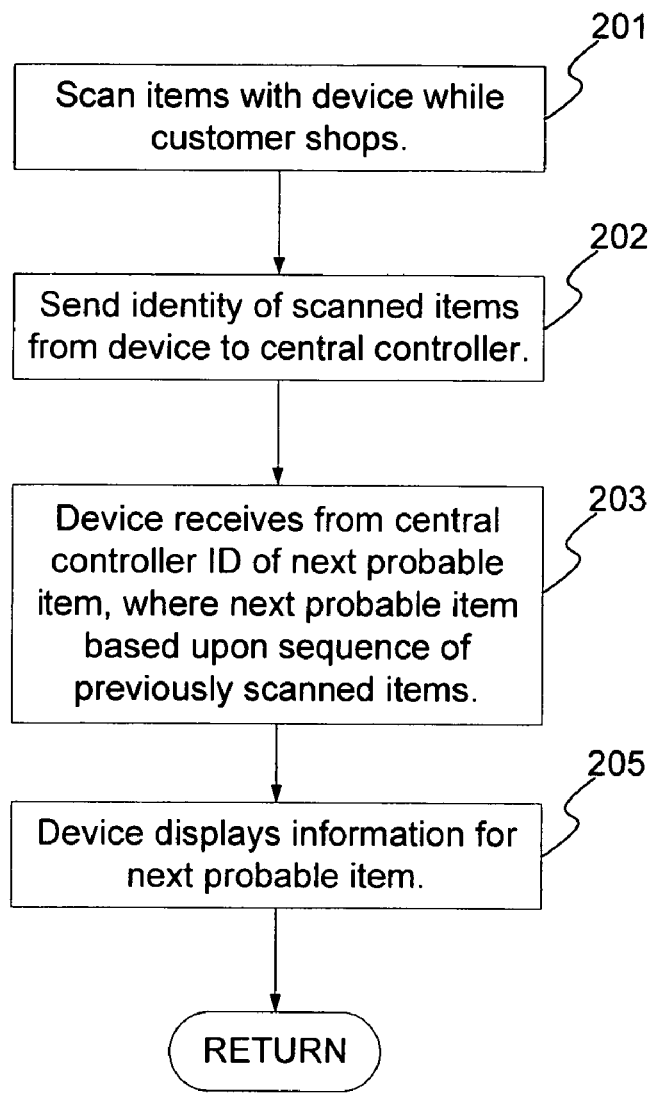

FIGS. 1 and 2 illustrate a preferred embodiment of a system and a method, respectively, for providing location-based targeted information in accordance with the present invention. The system includes a device 102 available to the customer 101 while the customer 101 is shopping. The device 102 includes a display 106 and a scanner 107. The scanner 107 scans items to be purchased by the customer 101 as the customer 101 obtains them, via step 201. The device 102 includes a storage 108 for ordinary computer program use such as buffers and state information, and optionally for temporarily storing the sequence in which items are scanned. The system further includes a central controller 103 which has the ability to communicate with the device 102. The communication can be of any medium, such as wireless communication. The device 102 sends the identity of the scanned items to the central controller 103, via step 202. At some point in time, the processor 104 of the central controller 103 analyzes the collected sequences and determines the next probable item for items in the store. The "next probable item", as used in this specification, is a list of one or more non-related items likely to be selected previously or subsequently by a customer. The next probable item need not be the most likely immediate selection, but can be one or more items removed. The next probable item determined by the processor 104 will generally be items that are located physically near the item scanned. This information is then stored in a database 105.

Once these correlations are in place, for an item just scanned, the central controller 103 can obtain the next probable item or items and send their identity to the device 102, via step 203. The device 102 then displays information for the next probable item, via step 205, on its display 102 to be viewed by the customer 101.

Figure 3:
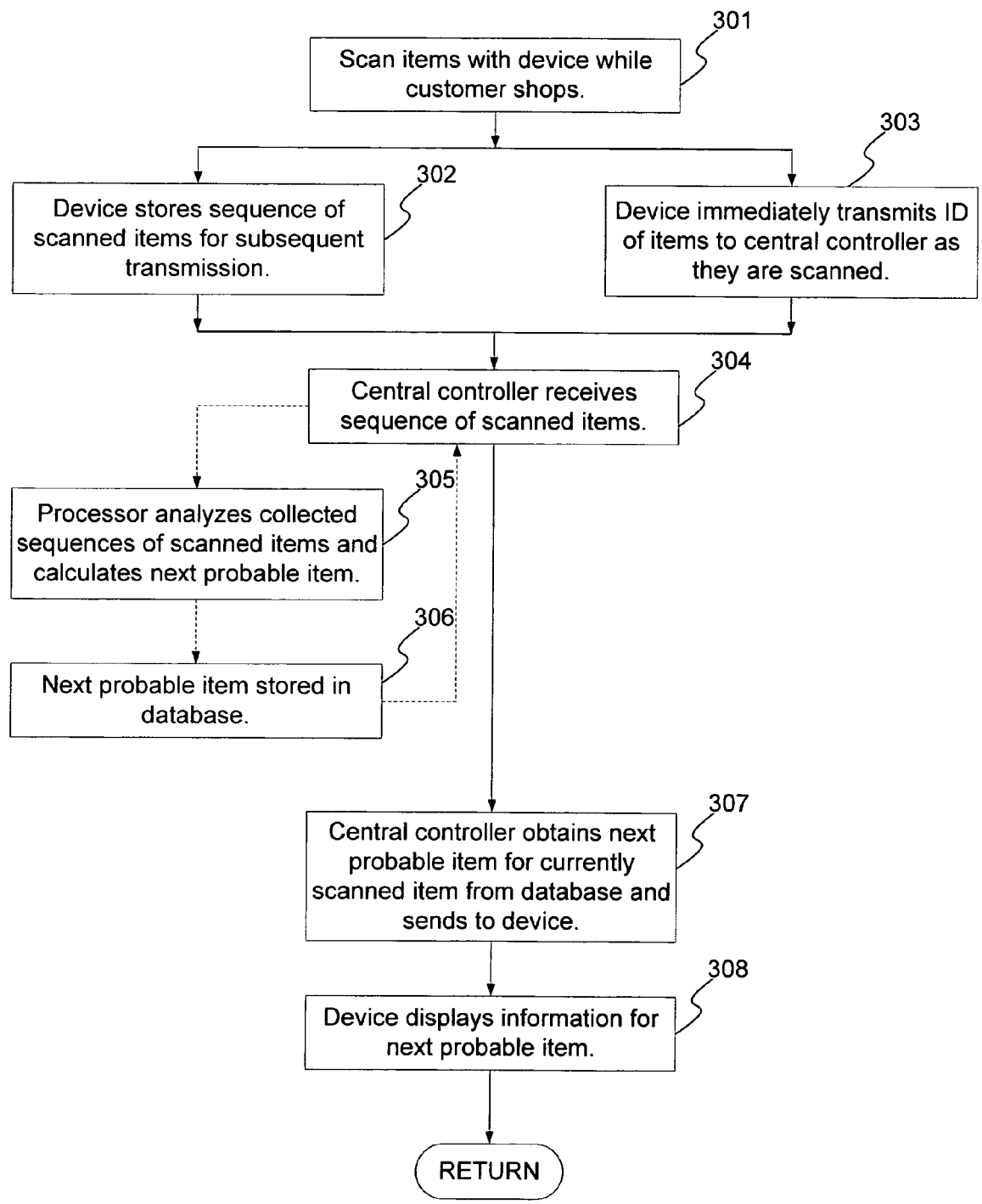
FIG. 3 is a flowchart illustrating in more detail the method for providing location-based targeted information in accordance with the present invention.

FIG. 3 is a flowchart illustrating in more detail the method for providing location-based targeted information in accordance with the present invention. For example, assume that the customer 101 is shopping in a grocery store and the device 102 is mounted on the shopping cart. As the customer 101 shops and removes a jar of peanut butter from a shelf, the jar is scanned with the device 102, via step 301. The customer 101 repeats these actions with each item. The device 102 temporarily stores the sequence in which these items are scanned. If the customer 101 scans a jar of jelly after the jar of peanut butter, then the jelly and the peanut butter are likely physically near each other. This sequence of scanned items is then sent from the device 102 to the central controller 103. The sequence can be stored by the device 102 for subsequent transfer to the central controller 103, via step 302, or the identity of the items are immediately transmitted to the central controller 103 as they are scanned, via step 303. In either case, the central controller 103 receives the sequence of the scanned items, via step 304.

The processor 104 of the central controller 103 analyzes collected sequences of scanned items and calculates the next probable item, via step 305. The next probable item can be calculated for each item in the database 105 or some subset of items. This process can be continuously or periodically performed as sequences are collected. The database 105 is then updated accordingly.

As the customer 101 shops and scans an item, the identity of this item is sent to the central controller 103. The central controller 103 obtains the next probable item for the currently scanned item from the database 105 and sends it to the device 102, via step 307. For example, assume that a jar of jelly has been determined to the next probable item for a jar of peanut butter. When the customer 101 scans a jar of peanut butter, the central controller 103 obtains the identity of the jar of jelly from the database 105 and sends it to the device 102. The device 102 then displays information for the next probable item, e.g. the jar of jelly, via step 308. The information can be an advertisement, a coupon or discount, or some other information to entice the customer 101 to purpose the jar of jelly.

To help account for opposite directions of travel, information for more than one next probable item can be displayed, or information for a preceding and a subsequent item can be displayed, or the next probable item can optionally be determined by association to the sequence of the most recent two or more items, rather than only the most recent item scanned. Optionally, a customer's recorded shopping history can be used in conjunction to narrow the selection of items as the "next probable item".

Because the analysis of the collected sequences are performed continuously or periodically, the next probable items are updated accordingly and the system is able to automatically adapt to changes in the store layout. To optimize this adaptation, more recent sequences, such as those within the last seven days, can be used exclusively or weighted more heavily in the analysis.

A method and system for providing location-based targeted information without requiring location sensing has been disclosed. In the method and system, items are scanned while the customer shops. The sequences in which items are scanned are collected and analyzed to determine the next probable item for a currently scanned item. The next probable item will generally be physically near the currently scanned item. Information for a next probable item correlating to a currently scanned item can then be displayed to the customer. In this manner, location-based targeted information can be provided without requiring location sensing. This significantly reduces the cost of the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing targeted information to a first customer as the first customer shops for items in a physical shopping environment, the method comprising:

obtaining at a first location within the physical shopping environment, an identity of a first item being scanned by a scanner operated by the first customer as the first customer shops;

sending the identity of the first item from the scanner to a central controller;

the scanner receiving from the central controller an identity of a next probable item to be scanned by the first customer as the first customer shops, the next probable item being determined based upon one or more stored ordered sequences of two or more items including the first item that are previously scanned by one or more second customers either directly before or after the first item and received at the central controller, and wherein the one or more ordered sequences including the first item represent an ordered physical path traveled through the physical shopping environment leading towards the next probable item;

and the scanner displaying information for the next probable item to be scanned to the first customer, the next probable item being physically immediate to the first location.

2. The method of claim 1, wherein obtaining an identity of a first item scanned by a scanner as the first customer shops comprises:

obtaining a sequence of items scanned by the scanner as the first customer shops; and storing the sequence of items scanned by the scanner as the first customer shops for subsequent transmission to the central controller, the sequence of items scanned by the scanner as the first customer shops being stored in a storage of the scanner.

3. The method of claim 1, wherein obtaining an identity of a first item scanned by a scanner as the first customer shops comprises:

obtaining an identity of a second item scanned by the scanner subsequent to the first item as the first customer shops; and immediately transmitting the identity of the second item from the scanner to the central controller.

4. The method of claim 1, wherein subsequent to sending the identity of the first item from the scanner to the central controller, the method further includes the central controller:

receiving the identity of the first item scanned by the scanner as the first customer shops;

obtaining from a database the identity of the next probable item to be scanned by the scanner as the first customer shops; and sending to the scanner the identity of the next probable item to be scanned by the scanner as the first customer shops.

5. The method of claim 4, wherein obtaining from a database the identity of the next probable item to be scanned as the first customer shops comprises:

collecting the one or more sequences of items previously scanned before or after the first item by the one or more second customers;

analyzing the one or more collected sequences including giving more weight to collected sequences that are more recent to determine the next probable item to be scanned as the first customer shops; and storing the next probable item in the database.

6. A method for providing targeted information to a second customer as the second customer shops for items in a physical shopping environment, the method comprising:

a central controller receiving a plurality of ordered sequences of two or more items scanned with a customer operated scanning device by a corresponding plurality of first customers as the first customers shop in a physical shopping environment;

for a first item in a given sequence of the plurality of sequences, the central controller analyzing the plurality of sequences of scanned items to determine a next probable item to be scanned subsequent to the first item, also included within the sequences, and being physically immediate the first item;

the central controller storing in a database the next probable item to be scanned subsequent to the first item, wherein when a scan of the first item by a second customer, after the plurality of first customers, is received by the central controller, the identity of the next probable item is sent to the device from the central controller and the device displays information for the next probable item to the second customer, and wherein the one or more ordered sequences including with the first item represent an ordered physical path traveled through the physical shopping environment towards the next probable item.

7. The method of claim 6, wherein each of the plurality of sequences is stored by the device for subsequent transmission to the central controller.

8. The method of claim 6, wherein an identity of each item scanned by the device is immediately transmitted to the central controller as the item is scanned.

9. A system for sending targeted information to a first customer as the first customer shops for items, the system comprising: a customer operated scanning device to scan a first item as the first customer shops; and a central controller to receive from the device an identity of the first item and send to the device an identity of a next probable item to be scanned by the device as the first customer shops, the next probable item being physically immediate the first item and determined based upon one or more ordered sequences of two or more items previously scanned before or after the first item by one or more second customers and including the first item, and wherein the one or more ordered sequences together with the first item represent an ordered physical path traveled through the physical shopping environment towards the next probable item, and wherein the device includes a display to display to the first customer information for the next probable item.

10. The system of claim 9, wherein the device includes a storage to store a sequence of items scanned by the device as the first customer shops for subsequent transmission to the central controller.

11. The system of claim 9, wherein the information for the next probable item comprises an advertisement or coupon corresponding to the next probable item.

12. The system of claim 9, wherein the central controller is configured to collect the one or more sequences of items previously scanned before or after the first item by the one or more second customers, analyze the one or more collected sequences including giving more weight to collected sequences that are more recent to determine the next probable item to be scanned as the first customer shops, and store the next probable item in a database.

13. A computer readable medium stored within a customer operated electronic scanner, the computer readable medium comprising program instructions tangibly stored thereon for providing targeted information to a first customer as the first customer shops for items in a physical shopping environment, the program instructions comprising instructions for: obtaining an identity of a first item scanned by the scanner as the first customer shops; sending the identity of the first item from the scanner to a central controller; the scanner receiving from the central controller an identity of a next probable item to be scanned as the first customer shops, the next probable item being physically immediate the first item and determined based upon one more ordered sequences of two or more items previously scanned before or after the first item by one or more second customers and including the first item; the scanner displaying information for the next probable item to the first customer; and wherein the one or more ordered sequences including the first item represent an ordered physical path traveled through the physical shopping environment towards the next probable item.

14. The computer readable medium of claim 13, wherein the instructions for obtaining an identity of a first item scanned by a scanner as the first customer shops comprises instructions for:

obtaining a sequence of items scanned by the scanner as the first customer shops; and storing the sequence of items scanned by the scanner as the first customer shops for subsequent transmission to the central controller, the sequence of items scanned by the scanner as the first customer shops being stored in a storage of the scanner.

15. The computer readable medium of claim 13, wherein the instructions for obtaining an identity of a first item scanned by a scanner as the first customer shops comprises instructions for:

obtaining an identity of a second item scanned by the scanner subsequent to the first item as the first customer shops; and immediately transmitting the identity of the second item from the scanner to the central controller.

16. The computer readable medium of claim 13, wherein subsequent to the instructions for sending the identity of the first item from the scanner to the central controller, the computer readable medium further comprises instructions for the central controller to:

receive the identity of the first item scanned by the scanner as the first customer shops;

obtain from a database the identity of the next probable item to be scanned by the scanner as the first customer shops; and send to the scanner the identity of the next probable item to be scanned by the scanner as the first customer shops.

17. The computer readable medium of claim 16, wherein the instructions for obtaining from a database the identity of the next probable item to be scanned as the first customer shops comprises instructions for:

collecting the one or more sequences of items previously scanned before or after the first item by the one or more second customers;

analyzing the one or more collected sequences including giving more weight to collected sequences that are more recent to determine the next probable item to be scanned as the first customer shops; and storing the next probable item in the database.

18. A computer readable medium stored within a customer operated electronic scanning device, the computer readable medium comprising program instructions tangibly stored thereon for providing targeted information to a second customer as the second customer shops for items in a physical shopping environment, the program instructions comprising instructions for: a central controller receiving a plurality of ordered sequences of two or more items scanned with the device by a corresponding plurality of first customers; for a first item in a given sequence of the plurality of sequences, the central controller analyzing the plurality of sequences of scanned items to determine a next probable item to be scanned subsequent to the first item, included in the sequences, and physically immediate to the first item; and the central controller storing in a database the next probable item to be scanned subsequent to the first item, wherein when a scan of the first item by a second customer is received by the central controller, the program instructions further include instructions to, send to the device an identity of the next probable item from the central computer, and display information for the next probably item to the second customer, and wherein the one or more ordered sequences including the first item represents an ordered physical path traveled through the physical shopping environment before reaching the next probable item.

19. The computer readable medium of claim 18, wherein each of the plurality of sequences is stored by the device for subsequent transmission to the central controller.

20. The computer readable medium of claim 18, wherein an identity of each item scanned by the device is immediately transmitted to the central controller as the item is scanned.

* * * * *